(12) United States Patent
Sweeney et al.

(10) Patent No.: US 10,550,886 B2
(45) Date of Patent: Feb. 4, 2020

(54) NONMETALLIC BEARING ON BEARING ASSEMBLY

(71) Applicant: Cascade Corporation, Fairview, OR (US)

(72) Inventors: Bryan Sweeney, Happy Valley, OR (US); Glenn Prentice, Milwaukie, OR (US); Luke Hazel, Gresham, OR (US); Chris Walthers, Gresham, OR (US)

(73) Assignee: Cascade Corporation, Fairview, OR (US)

( * ) Notice: Subject to any disclaimer, the term of this patent is extended or adjusted under 35 U.S.C. 154(b) by 0 days.

(21) Appl. No.: 15/210,082

(22) Filed: Jul. 14, 2016

(65) Prior Publication Data
US 2018/0017108 A1 Jan. 18, 2018

(51) Int. Cl.
*F16C 33/20* (2006.01)
*F16C 33/10* (2006.01)
*F16C 29/02* (2006.01)

(52) U.S. Cl.
CPC ............ *F16C 33/20* (2013.01); *F16C 33/102* (2013.01); *F16C 29/02* (2013.01); *F16C 2208/20* (2013.01)

(58) Field of Classification Search
CPC .... F16C 29/002; F16C 29/02; F16C 32/0633; F16C 32/0651; F16C 32/0655; F16C 32/0659; F16C 33/20; F16C 33/102
USPC ...................................................... 384/26, 42
See application file for complete search history.

(56) References Cited

U.S. PATENT DOCUMENTS

| 2,782,065 A | 2/1957 | Lord |
| 2,804,181 A | 8/1957 | Haynes |
| 2,888,300 A * | 5/1959 | Curtis ...................... B66F 9/08 |
| | | 384/42 |
| 3,243,236 A | 3/1966 | Graham |
| 3,512,671 A | 5/1970 | Morocco |
| 4,299,008 A | 11/1981 | Burns |
| 4,335,992 A | 6/1982 | Reeves |
| 4,442,922 A | 4/1984 | Johannson |

(Continued)

FOREIGN PATENT DOCUMENTS

| CA | 1299528 C | 4/1992 |
| DE | 3801101 A1 | 7/1989 |
| EP | 2612836 A1 | 7/2013 |

OTHER PUBLICATIONS

International Search Report prepared by the US Patent and Trademark Office for PCT/US2016/069514, dated Mar. 23, 2017, 2 pages.

(Continued)

*Primary Examiner* — James Pilkington
(74) *Attorney, Agent, or Firm* — Chernoff, Vilhauer, McClung & Stenzel, LLP (57) ABSTRACT

A slide-bearing assembly capable of enabling sliding of a load-carrying surface relative to a load-supporting structure, such that the slide-bearing assembly may include a first arrangement of at least one substantially nonmetallic elongate bearing element capable of extending along a first load-carrying surface and a second arrangement of at least two substantially nonmetallic elongate bearing elements capable of extending longitudinally in series along a second load-carrying surface parallel to the first load-carrying surface such that the second load-carrying surface is in noncoextensive supportive relationship with the first load-carrying surface.

10 Claims, 6 Drawing Sheets

(56) References Cited

U.S. PATENT DOCUMENTS

| | | | |
|---|---|---|---|
| 4,509,870 A | 4/1985 | Taki | |
| 5,192,189 A * | 3/1993 | Murata | B60P 1/32 |
| | | | 296/183.2 |
| 5,199,533 A | 4/1993 | Wilke | |
| 5,707,201 A | 1/1998 | Hamlik | |
| 5,807,060 A | 9/1998 | Hamlik | |
| 5,820,270 A | 10/1998 | Richardson | |
| 6,036,429 A | 3/2000 | Johnson | |
| 6,056,499 A | 5/2000 | Bressner | |
| 6,227,352 B1 | 5/2001 | Johnson | |
| 6,257,766 B1 | 7/2001 | Agari | |
| 8,104,962 B2 * | 1/2012 | Niedermeyer | F16C 29/02 |
| | | | 384/40 |
| 9,061,871 B2 | 6/2015 | Miwa et al. | |
| 2002/0021030 A1 | 2/2002 | Hermsen et al. | |
| 2013/0048807 A1 * | 2/2013 | Roberts | F02K 1/09 |
| | | | 384/26 |
| 2014/0321778 A1 * | 10/2014 | Buchmann | F16C 29/005 |
| | | | 384/26 |
| 2015/0323005 A1 | 11/2015 | Villemagne et al. | |

OTHER PUBLICATIONS

Written Opinion prepared by the US Patent and Trademark Office for PCT/US2016/069514, dated Mar. 23, 2017, 9 pages.

* cited by examiner

NONMETALLIC BEARING ON BEARING ASSEMBLY

BACKGROUND OF THE INVENTION

The subject matter of this application relates to a slide bearing system useable with a load-handling or carrying system and a corresponding load-supporting structure, such as used with a lift truck. The combination of a load-handling system and a load-supporting structure often includes surfaces that continuously slide against one another. Continuous movement leads to wear and damage to the interface parts, thus requiring frequent repair or replacement of expensive parts. Depending on the materials present at the interface, such movement may also create enhanced frictional heat at the interface which can cause damage to other non-heat-resistant components, and also may require increased energy output from the lift truck to create movement at the interface.

Nonmetallic materials such as nylon have been used as bearings where only a single bearing is attached to one moving surface, thereby leaving the opposing surface exposed. With the use of only a single nonmetallic bearing, the single bearing normally slides against a steel surface of the opposing load carrying component, causing a high rate of wear.

Conversely, as will be discussed in detail herein, the use of plastic bearings on both opposing load-carrying surfaces results in lower wear and lower forces required to move a load and thereby reduce the energy consumption of the operation.

SUMMARY OF THE INVENTION

In one embodiment, the invention described herein may include a slide-bearing assembly capable of enabling sliding of a load-carrying implement relative to a load-supporting structure, such that the slide-bearing assembly includes substantially nonmetallic first and second opposing elongate bearing elements capable of extending in parallel to support the load-carrying implement slidably upon the load-supporting structure. The embodiment may be advantageously constructed so that one of the bearing elements is composed of multiple elongate pieces, each shorter in length than the length of the other of the bearing elements.

In another embodiment, the invention described herein may include a slide-bearing assembly capable of enabling sliding of a load-carrying surface relative to a load-supporting structure, such that the slide-bearing assembly may include a first arrangement of at least one substantially nonmetallic elongate bearing element capable of extending along a first load-carrying surface and a second arrangement of at least two substantially nonmetallic elongate bearing elements capable of extending longitudinally in series along a second load-carrying surface parallel to the first load-carrying surface such that the second load-carrying surface is in non-coextensive supportive relationship with the first load-carrying surface.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
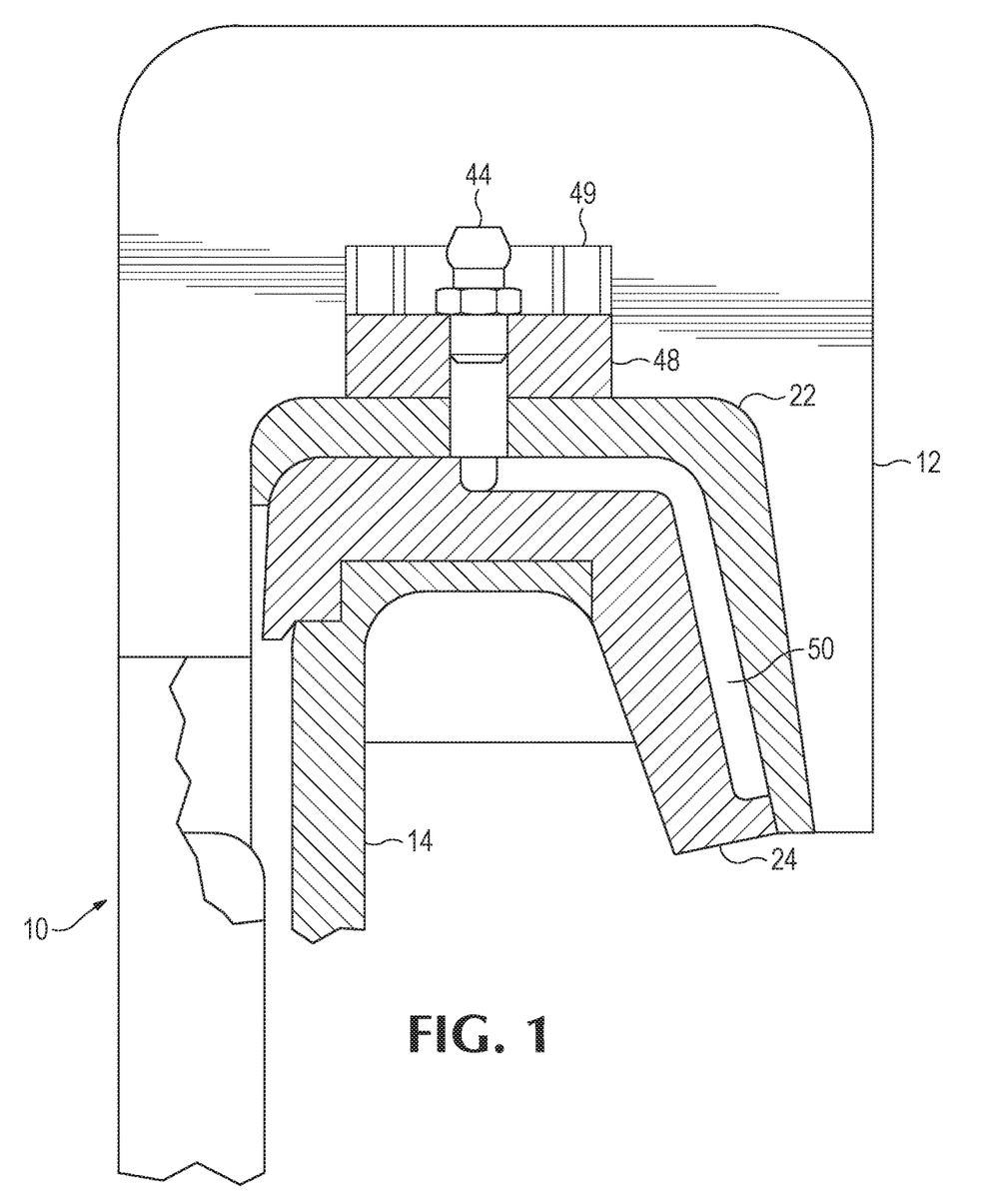
FIG. 1 is a sectional view of a J-plate assembly.
Figure 2:
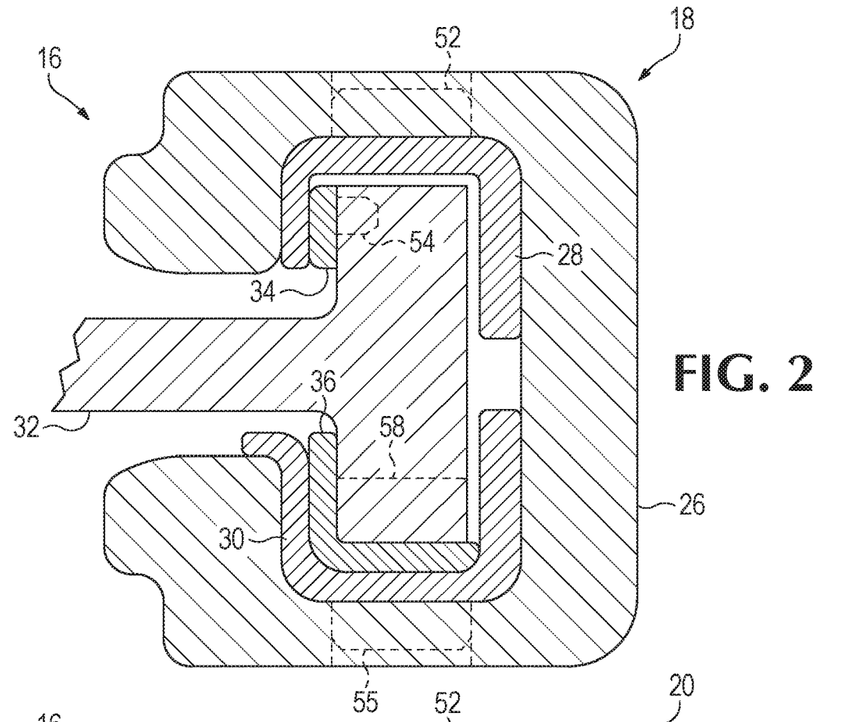
FIG. 2 is a sectional view of an upper arm assembly.
Figure 3:
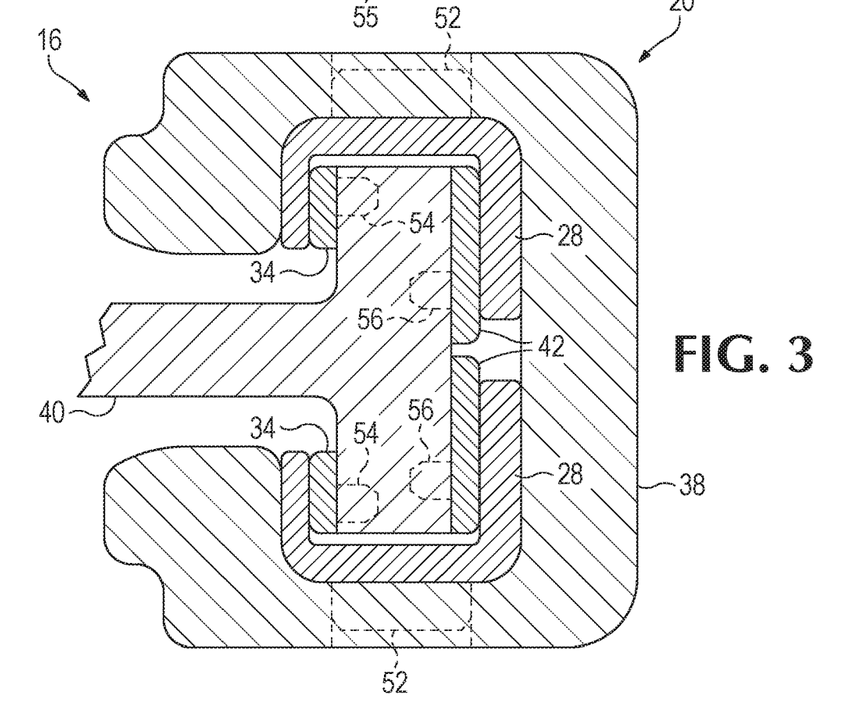
FIG. 3 is a sectional view of a lower arm assembly.

Referring now to the drawings which form a part of the disclosure herein, FIGS. 1, 2 and 3 are sectional views of bearings assembled with a load-supporting structure such as a lift truck. In one embodiment, FIG. 1 shows a sectional view of a bearing on bearing assembly associated with a translating upper hook 12 and a non-translating or stationary J-plate 14, referred to together as the J-plate assembly 10.

In another embodiment, FIGS. 2 and 3 show sectional views of different respective upper 18 and lower 20 bearing on bearing channel assemblies for translating arms or carriers. These two different channel assemblies are referred to in combination as the arm assembly 16.

Figure 4:
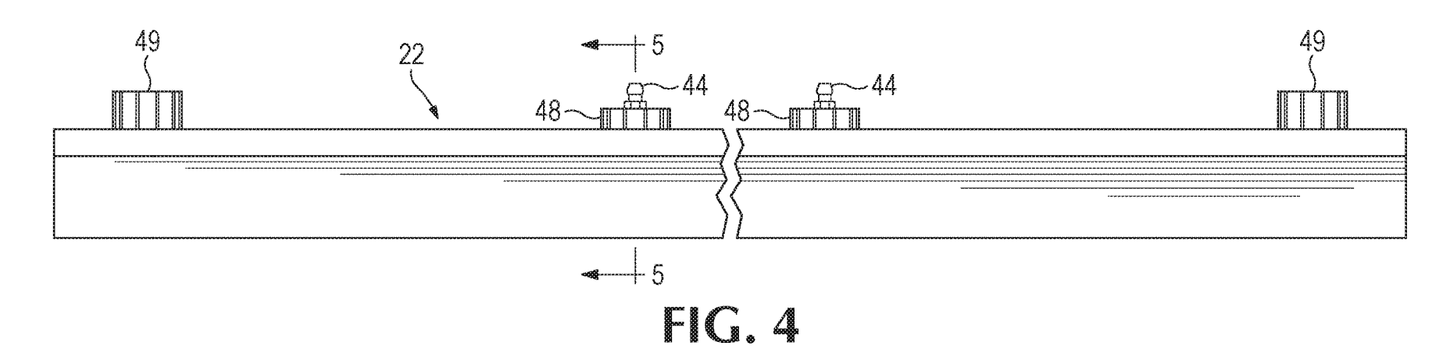
FIG. 4 is a plan view of an upper hook bearing.
Figure 5:
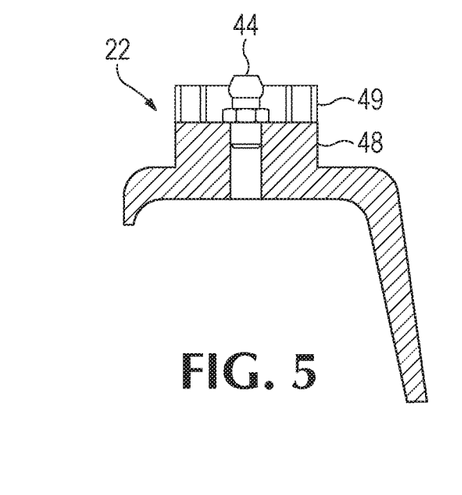
FIG. 5 is a sectional view of the upper hook bearing shown in FIG. 4.
Figure 6:
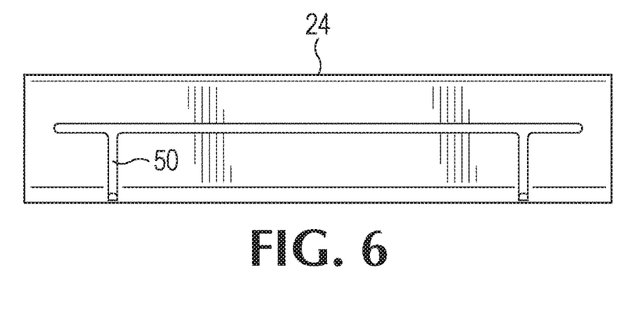
FIG. 6 is a top plan view of a J-plate bearing.
Figure 7:
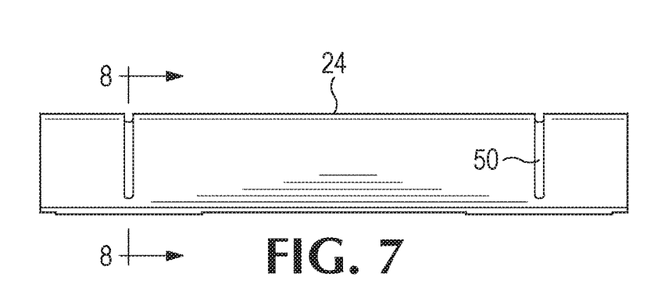
FIG. 7 is a side plan view of the J-plate bearing shown in FIG. 6
Figure 8:
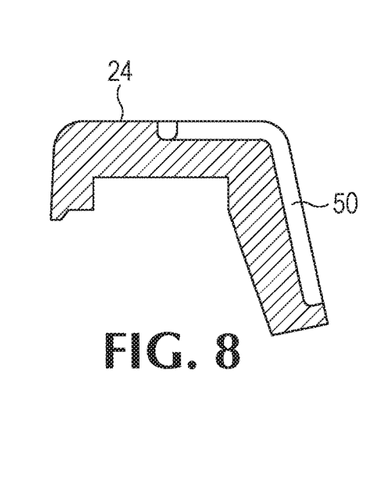
FIG. 8 is a sectional view of the J-plate bearing shown in FIG. 6.
Figures 9, 10, 11:
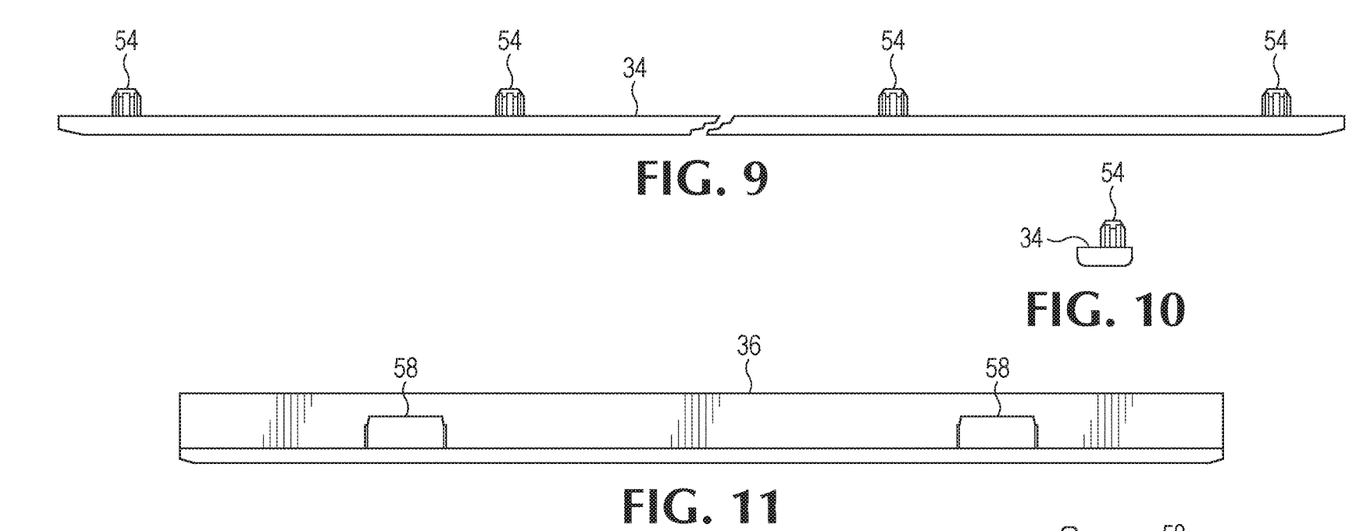
FIG. 9 is a plan view of a primary T-bar bearing.
FIG. 10 is a side plan view of the primary T-bar bearing shown in FIG. 9.
FIG. 11 is a plan view of a secondary T-bar bearing.
Figures 12, 13, 14:
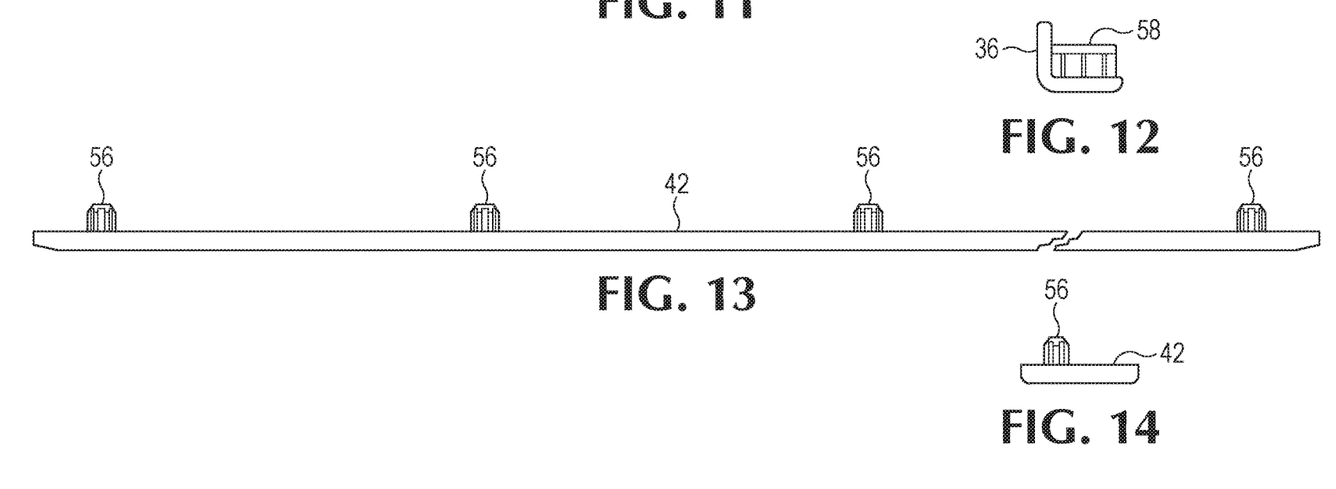
FIG. 12 is a side plan view of the secondary T-bar bearing shown in FIG. 11.
FIG. 13 is a plan view of a tertiary T-bar bearing.
FIG. 14 is a side plan view of the tertiary T-bar bearing shown in FIG. 13.

In the embodiment shown in FIG. 1, the J-plate assembly 10 includes a single upper hook bearing 22 attached to a load-carrying surface of the translating upper hook 12. Plan and sectional views of the upper hook bearing 22 are shown in FIGS. 4 and 5. Attached to a second load-carrying surface of the non-translating J-plate 14 are J-plate bearings 24, shown in detail in FIGS. 6, 7 and 8. The first and second load-carrying surfaces are at least substantially parallel to one another.

As best viewed in FIGS. 4 and 5, the upper hook bearing 22 may be constructed with one or more posts 48, 49. Each such post 48, 49 is sized and shaped to fit in one or more recesses within a load-bearing surface of the translating upper hook 12 to stabilize and secure the upper hook bearing 22 to the upper hook 12. Therefore, in use, as the translating upper hook 12 moves in a transverse direction, the upper hook bearing 22 remains secured to the translating upper hook 12 and slides against the J-plate bearing 24.

The embodiment of the upper hook bearing 22 together with the J-plate bearing 24, shown in FIGS. 1, 4 and 5, may have a self-lubricating, greasable interface with the use of at least one grease supply fitting 44, such as a Zerk fitting, located within a post 48, and a corresponding grease pathway 50 in the J-plate bearing 24. Self-lubricating bearings remove the need for maintenance because they do not need to be frequently changed or cleaned. Zerk fittings, as shown in the embodiment in FIG. 1, communicate with grease pathways 50 in the bearing surface to improve efficiency of translating movement by using grease between the bearings to further reduce friction. Grease can be applied at regular intervals with the use of a grease gun (not shown). The grease fills pathways 50 in the surface of the lower bearings (in the present embodiment, the J-plate bearing 24) that spread the grease over the interface between the bearings.

Figure 19:
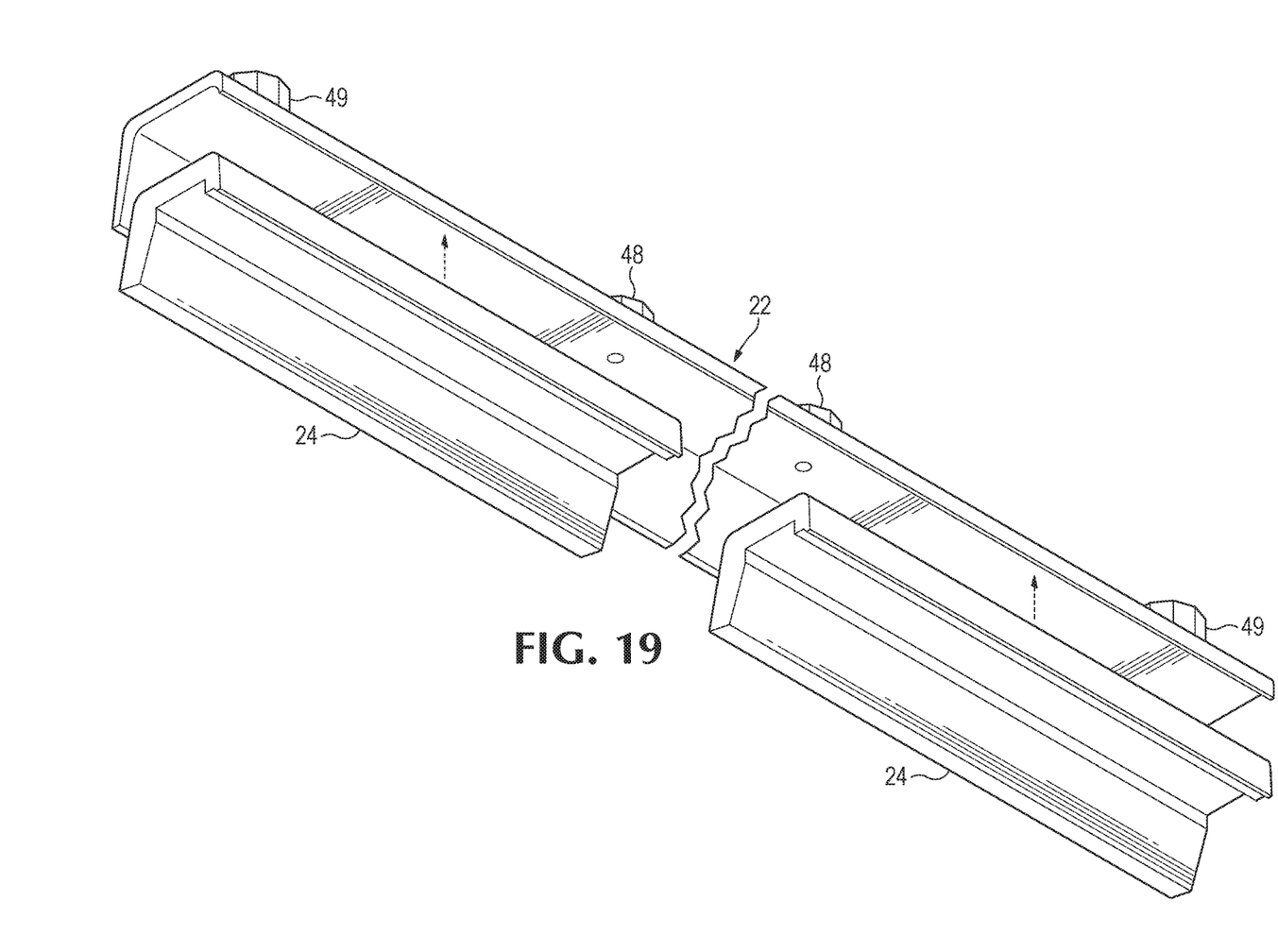
FIG. 19 is a perspective view of the upper hook bearing, shown in FIGS. 4-5, and the J-plate bearing, shown in FIGS. 6-8.

In one non-limiting exemplary embodiment, the upper hook bearing 22 used may be approximately 620 millimeters in length. The J-plate bearing 24 may be approximately 200 millimeters in length. In an assembly as shown in FIG. 1, two J-plate bearings 24 may be secured to the stationary J-plate 14 end-to-end in a transverse direction, and one upper hook bearing 22 may be secured to the translating upper hook 12 in the same direction. Accordingly, there may be an end-to-end gap between the two J-plate bearings 24, as shown in FIG. 19. The configuration of the dual J-plate bearings 24 may be referred to as a single elongate bearing element composed of multiple elongate pieces. Depending on manufacturer's specifications, the upper hook bearing 22 and the J-plate bearing 24 may have different lengths. The depths and widths of individual bearings may be uniquely selected based on manufacturer specifications as well. In one embodiment, the length of the upper hook bearing 22 will be longer than the length of the dual J-plate bearings 24 because the translating upper hook 12 has a transverse width greater than the width of the stationary J-Plate 14. Such a configuration avoids the potential issue of having a bearing being completely disengaged during the translational motion between the translating upper hook 12 and the stationary J-Plate 14.

Figures 15, 16:
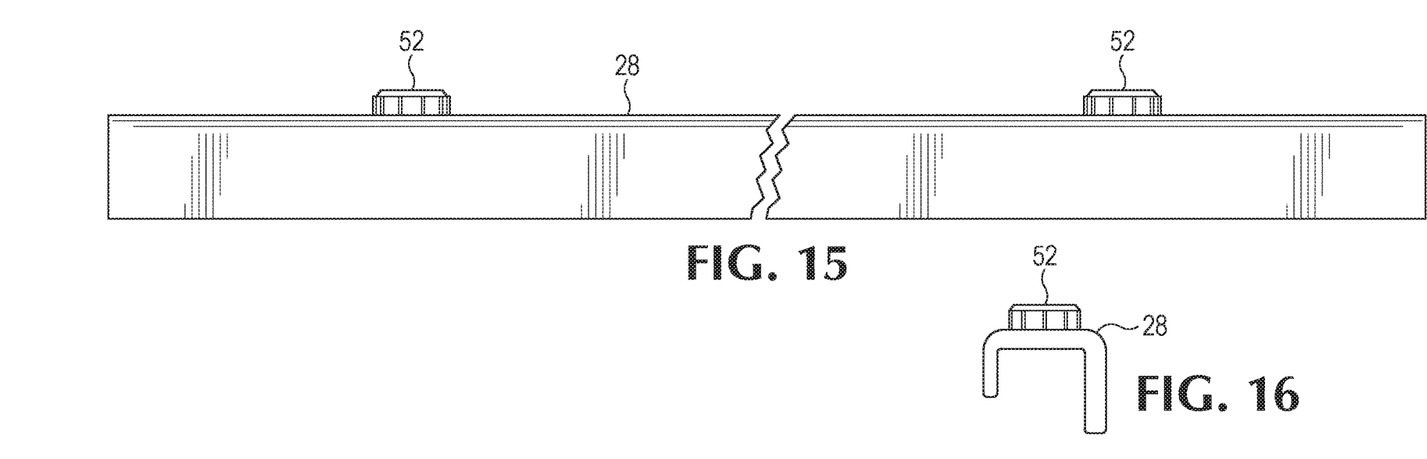
FIG. 15 is a plan view of a primary C-channel bearing.
FIG. 16 is a side plan view of the primary C-channel bearing shown in FIG. 15.
Figure 17:
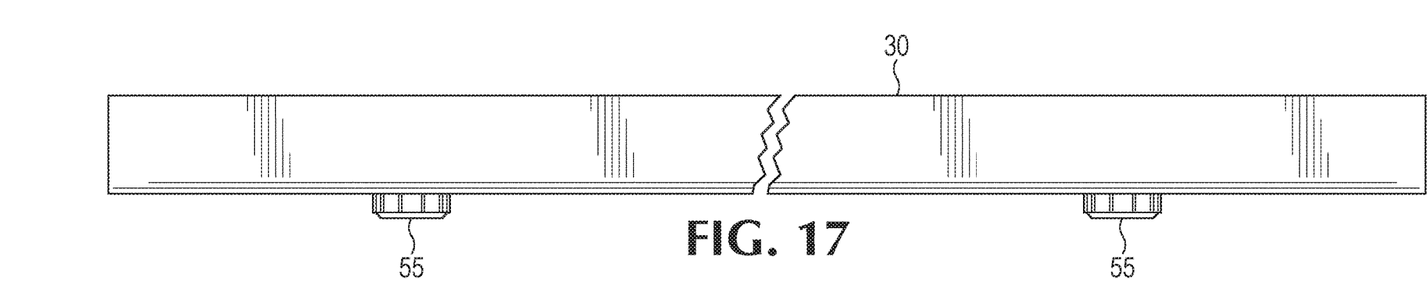
FIG. 17 is a plan view of a secondary C-channel bearing.
Figure 18:
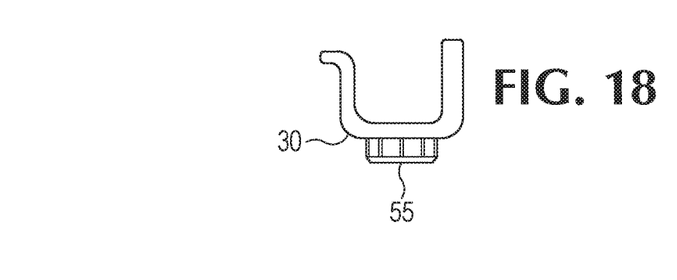
FIG. 18 is a side plan view of the secondary C-channel bearing shown in FIG. 17.

The alternative embodiment shown in FIG. 2 illustrates an upper bearing on bearing channel assembly 18, and the primary C-channel bearings 28 are attached to a load carrying surface of upper C-channel 26. Plan and sectional views of an exemplary embodiment of the primary C-channel bearing 28 are shown in FIGS. 15 and 16. Secondary C-channel bearings 30 are attached to the load carrying surface of upper C-channel 26 as well. Plan and sectional views of an exemplary embodiment of the secondary C-channel bearing 30 are shown in FIGS. 17 and 18. Partially encompassed by the upper C-channel 26 is an upper translating T-bar 32. Both a primary T bar bearing 34 and a secondary T bar bearing 36 are attached to the load carrying surface of upper T-bar 32, as best viewed in FIG. 2. The plan and sectional views of primary and secondary T-bar bearings 34 and 36 are shown in FIGS. 9 and 10 and FIGS. 11 and 12, respectively.

In one non-limiting exemplary embodiment, the primary C-channel bearing 28 may be approximately 334 millimeters. Two primary C-channel bearings 28 may be secured to the upper C-channel 26 in a transverse direction. The secondary C-channel bearing 30 may also be approximately 334 millimeters. Two secondary C-channel bearings 30 may be secured to the upper C-channel 26 in series or in a transverse direction. The primary T-bar bearing 34 may have a length of approximately 265 millimeters. The secondary T-bar bearing 36 may have a length of approximately 265 millimeters. In other embodiments, the bearings described herein may be of other lengths. The other dimensions of the bearings, such as the depth and width, may be selected based on manufacturer specification. In this embodiment, the lengths of the primary and secondary T-bar bearings 34, 36 are limited by the transverse width of the upper T-bar 32.

In the embodiment of the lower bearing on bearing channel assembly 20, two primary C-channel bearings 28 are attached to a load carrying surface of the lower C-channel 38. Primary C-channel bearings 28 are attached on the top and bottom parts of load-carrying surfaces of the lower C-channel 38, as best viewable in FIG. 3. Partially encompassed by the lower C-channel 38 is a lower translating T-bar 40. A pair of primary T-bar bearings 34 are attached to a load carrying surface of one side of the lower translating T-bar 40. A pair of tertiary T-bar bearings 42 are attached to a load carrying surface one side of the lower translating T-bar 40.

Primary C-channel bearings 28 and secondary C-channel bearings 30 may also include posts 52, 55 which extend out of the bearings 28, 30 into corresponding spaces in the load-carrying surface of the upper C-channel 26, as best viewable in FIG. 2. Primary T-bar bearing 34 and tertiary T-bar bearings 42 may also be constructed with posts 54, 56, respectively. Secondary T-bar bearing 36 includes rectangular bearings 58.

In one non-limiting exemplary embodiment, the primary C-channel bearing 28 may be approximately 334 millimeters. Two primary C-channel bearings 28 may be secured to the lower C-channel 38 in series or in a transverse direction. The primary T-bar bearing 34 may have a length of approximately 265 millimeters. The tertiary T-bar bearing 42 may have a length of approximately 265 millimeters. The other dimensions of the bearings, such as the depth and width, may be selected based on manufacturer specification. In this embodiment, the lengths of the primary and tertiary T-bar bearings 34, 42 are limited by the transverse width of the lower T-bar 40.

Such assembly embodiments 10, 16 may have load bearing surfaces with multiple shorter bearing sections positioned in series, along the width of a load-supporting structure such as a side shifter, in slidable contact with a longer bearing section. An advantage of having multiple shorter bearings is that a manufacturer may accommodate a wide range of side shifter widths by using multiples of the small support bearings. The lengths of the bearings may be selected so that the bearing lengths manufactured accommodate the widths of a variety of frame widths, thereby avoiding the need to manufacture new bearings at different lengths for each different frame width. Therefore, a manufacturer would be able to reduce the number of unique bearings it would need to produce.

In one embodiment of the invention, the bearings (22, 24, 28, 30, 34, 36, 42) may have chamfered ends. An assembly, however, for example the J-plate assembly 10, may include bearings that have both chamfered, partially chamfered and non-chamfered ends. Chamfered ends may be beneficial in such assemblies 10, 16 by minimizing the potential of non-chamfered or otherwise cornered ends from one bearing getting caught with an end of another bearing during use.

In some embodiments of the present invention, the bearings are substantially non-metallic. In some embodiments, the stationary bearings are nylon 6/6, 10% Aramid Fiber, 15% PTFE. In some embodiments, the translating bearings are nylon 6/6, 30% carbon fiber, 15% PTFE. Such bearings may also be made out of ceramic materials.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A slide-bearing assembly capable of enabling sliding of a load-carrying implement relative to a load-supporting structure, having a first and a second load-carrying surface, respectively, said slide-bearing assembly comprising:
   (a) substantially nonmetallic first and second elongate bearing elements extending in parallel to support said first load-carrying surface of said load-carrying implement slidably upon said load-supporting structure;
   (b) one of said bearing elements being composed of multiple elongate pieces each shorter in length than a length of the other of said bearing elements; and
   (c) said second load-carrying surface having an at least partially rectangular surface shape, said surface shape corresponding to surface shapes of surfaces of each of said multiple elongate pieces, such that said corresponding surfaces of said multiple elongate pieces abut said second load-carrying surface;
   (d) a post that extends from a bearing surface of each of the multiple elongate pieces, the surface being a surface that is opposed to the first load-carrying surface, each post is sized to fit in a respective recess of the first load-carrying surface; and
   (e) a grease pathway between said first and said second elongate bearing elements.

2. The slide-bearing assembly of claim 1 wherein said multiple elongate pieces include ends that are partially chamfered.

3. The slide-bearing assembly of claim 1 wherein the grease pathway includes a grease supply fitting in said first elongate bearing element and a corresponding grease pathway in said second elongate bearing element.

4. The slide-bearing assembly of claim 3 wherein the corresponding grease pathway is along a bearing surface of the second bearing element that is adjacent to the first bearing element such that, when grease is introduced through the grease supply fitting and into the corresponding grease pathway, the grease is in contact with the first bearing element along the corresponding grease pathway.

5. A slide-bearing assembly capable of enabling sliding of a load-carrying implement relative to a load-supporting structure, having a first and a second load-carrying surface, respectively, said slide-bearing assembly comprising:
   (a) a first arrangement of at least one substantially nonmetallic elongate bearing element having a first bearing surface, said surface extending along and secured on said first load-carrying surface, said first bearing surface affixed on said first load-carrying surface with the use of at least one post extending from a surface that is opposed to the first load-carrying surface;
   (b) a second arrangement of at least two substantially nonmetallic elongate bearing elements extending longitudinally in series along said second load-carrying surface parallel to said first load-carrying surface; and
   (c) a grease supply fitting in said post.

6. The slide-bearing assembly of claim 5 wherein said first arrangement includes at least two substantially nonmetallic elongate bearing elements of unequal lengths.

7. The slide-bearing assembly of claim 5 wherein said second arrangement includes at least two substantially nonmetallic elongate bearing elements of unequal lengths.

8. The slide-bearing assembly of claim 5 wherein said first and second arrangements of elongate bearing elements are arranged in parallel and are partially chamfered to avoid physical interactions between edges of said elongate bearing elements.

9. The slide-bearing assembly of claim 5 wherein the assembly includes a grease pathway between said first and said second arrangements.

10. The slide-bearing assembly of claim 5 further including a grease pathway in said second arrangement.

* * * * *

UNITED STATES PATENT AND TRADEMARK OFFICE
CERTIFICATE OF CORRECTION

PATENT NO. : 10,550,886 B2  
APPLICATION NO. : 15/210082  
DATED : February 4, 2020  
INVENTOR(S) : Bryan Sweeney et al.

Page 1 of 1

It is certified that error appears in the above-identified patent and that said Letters Patent is hereby corrected as shown below:

At Column 5, Line 28 (Claim 1, subparagraph (d)): Delete "bearing".

Signed and Sealed this  
Tenth Day of November, 2020

Andrei Iancu  
*Director of the United States Patent and Trademark Office*